No. 763,207. PATENTED JUNE 21, 1904.
J. J. RIDGWAY.
BELT CONVEYER.
APPLICATION FILED OCT. 27, 1903.
NO MODEL.
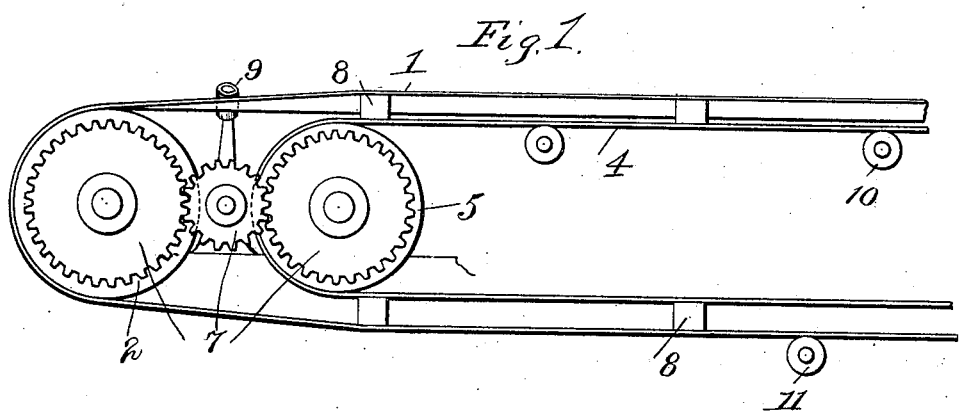
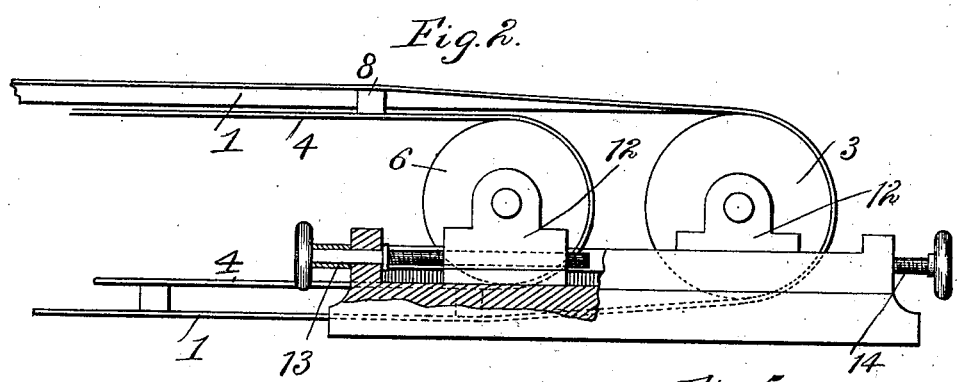
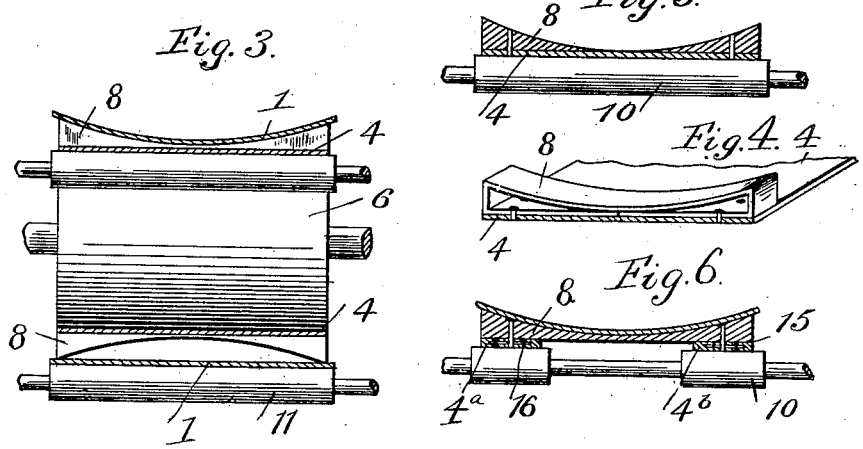
Witnesses
Inventor
John J. Ridgway
By his Attorney No. 763,207.

Patented June 21, 1904.

UNITED STATES PATENT OFFICE.

JOHN J. RIDGWAY, OF ROSEBANK, NEW YORK.

BELT CONVEYER.

SPECIFICATION forming part of Letters Patent No. 763,207, dated June 21, 1904.

Application filed October 27, 1903. Serial No. 178,684. (No model.)

*To all whom it may concern:*

Be it known that I, JOHN J. RIDGWAY, a citizen of the United States, residing at Rosebank, Staten Island, in the county of Richmond and State of New York, have invented certain new and useful Improvements in Belt Conveyers, of which the following is a specification.

My invention relates to that form of apparatus for conveying matters in bulk in which an endless belt is employed to receive and carry the ore, grain, or other material to be conveyed. Such belts, made usually of canvas and rubber, are of flexible material and in order that they may hold the material being conveyed are forced to assume the form of a longitudinal trough during the passage of the belt through the upper part of its travel.

In some forms of belt the trough has been formed by thickening the edges of the belt instead of by causing the belt to dip or cup in trough form. To thicken or flange the edge of the belt, however, is expensive and as applied to belts of great length and which travel over tripping devices, impracticable, so that for such uses the method employed has been to dip or cup the belt by flexing it transversely. Various devices have been employed or suggested for this. An early one was the use of double-cone rollers; but the difference in travel of the different parts of such rollers is destructive to the belt. Another form has had three carrying-rolls, one horizontal and the other angularly disposed with relation to it and serving to hold up the edges of the belt; but the action of such means of support, owing to the constant flexing of the belt at the angle between the rolls, is to quickly break the belt at the angle, and to have sufficient life belts having this means of support must be of exceedingly fine quality and are very expensive. Another suggestion, which, however, so far as I know, has never been carried out practically, is that the edges of the belt be carried on narrow inclined strips or belts traveling with the belt over the same rollers and driven by frictional contact therewith. This plan is impracticable on account of lateral thrust caused by the strain on the belt and weight thereon and the liability of the two narrow strips to stretch differently.

The object of my invention is to provide a conveyer-belt which can be economically produced, effective in its action, and not subject to the wear and tear incident to the prior constructions described. The main conveying-belt is of customary flat form, (although the part of its surface subjected to most wear may be thickened, if desired;) but it may be made of lighter and cheaper material than customary on account of the advantages arising from its use in connection with the other elements of my improved structure. Extending parallel with the main belt and within it I arrange a supporting belt or carrier having fixed thereto transversely at suitable intervals troughing devices (preferably cleats) which are curved or troughed in a direction transverse of the belt. The two belts are both positively driven and at the same speed. The supporting-belt is carried by flat idle rolls disposed at suitable intervals throughout its length, and is thus not subject to transverse flexure, while the main or conveyer-belt proper once laid on the troughing members of the supporting-belt assumes trough shape and retains that shape during the conveying part of its travel, and so is not subject to the wear and tear which takes place in those prior contrivances wherein the belt is flexed back and forth in its passage between and over the supporting-rolls.

In the accompanying drawings, Figure 1 is a side elevation of my improved belt conveyer at the head or driving end. Fig. 2 is a similar view of the same at the tail end, at which the adjusting devices are arranged. Figs. 3, 4, 5, and 6 are transverse sectional views of the belt near one of the transverse supports or cleats, the four views showing two different ways of constructing such supports or cleats.

1 is the conveying-belt proper, of usual or any preferred construction, carried over the driving-roller 2 and take-up roller 3 and passing, if required, over intermediate tripping devices, which being no part of my invention are not here shown. Immediately within the belt 1 and arranged parallel thereto is a supporting-belt 4, carried on driving-roll 5 and take-up roll 6. The connections 7 for driving the rolls 2 and 5 may be gears, belts, sprocket-chains, or other devices adapted to give to the two belts a positive movement in the same direction and at the same speed. The belt 1 is not directly carried by the belt 4, but is supported therefrom at that portion of its length upon which it carries material by means of troughing members consisting, as here shown, of transverse supports or cleats 8, which may be of shaped blocks of wood, as shown in Fig. 3, or bent up of metal, as shown in Fig. 4. In either case they are fastened by rivets or otherwise to the belt 4, and the belt 1 rests thereon and is carried in trough shape thereby, the strain on the belt forcing it to trough form.

I prefer to relieve the belt of the strain and wear which would be occasioned by its being bent directly upon the cleats or supports 8 after it leaves the driving-roller 2 by arranging on each side of the belt 1 in rear of the driving-roller 2 angularly-disposed idle rolls 9, supported on suitable framework and so disposed as to bend the edges of the belt up in such position that they will be laid without friction or strain into the grooves of the cleats or supports as the same successively run round the driving-roller 5 and into contact with the conveyer-belt 1.

The supporting-belt 4 is carried by plain cylindrical rolls 10, horizontally disposed and maintaining the supporting-belt in flat condition during the portion of its travel at which the belt is conveying material. The return leg of the belt 1 runs flat, as usual, over supporting-rolls 11, and the supporting-belt 4, with its cleats 8, rests upon it during this portion of the travel. The supporting-carriages 12 for the rollers 3 and 6 have independent take-up devices—such, for example, as are illustrated at 13 14—to maintain the tension of the two belts in proper relation to each other.

Numerous modifications may be made in the invention besides those already indicated. For example, the cleats or troughing members may be arranged close together or may, if spaced apart, be arranged at varying distances to suit the requirements of the work to be done. The said cleats instead of extending entirely across the supporting-belt may be half-cleats, as shown in Fig. 5, in which case the center of the supporting-belt affords support to the center of the main or conveyer belt proper. To support the cleats, furthermore, it is not necessary to always have the supporting-belt in one piece. I have found that the ends of the cleats may be carried on two separate narrow strips or belts $4^a$ $4^b$, as indicated in Fig. 6, providing the belts $4^a$ and $4^b$ are so constructed as to prevent them from uneven stretching. To accomplish this, I may form the belts $4^a$ $4^b$ of a composite structure of fabric or its equivalent 15 and a flexible steel ribbon or wire core 16 embedded therein. The ends of the steel core of such a belt being rigidly fastened together, so as to make a practically endless steel core for the belt, it is almost absolutely prevented from stretching under any normal strain, and yet the belt remains sufficiently flexible for the purposes intended. With this construction means are provided for preventing the tendency to spread the belts $4^a$ $4^b$ which would be caused by the strain of the main conveyer-belt. Where, as illustrated in Fig. 6, cleats or troughing devices 8 of substantially the width of the main belt are employed, they being fixed to the belts or carriers $4^a$ $4^b$ will themselves prevent the spreading of such carriers. The substantially accurate tracking of the main belt being assured in the usual manner by slightly crowning the main driving and take-up rollers 2 3 and the narrow belts or carriers $4^a$ $4^b$ being prevented from spreading, as just described, for supporting a belt of this character the carrying-rolls $10^a$ $10^b$ may be shorter, only of sufficient length to afford support to the narrow supporting-belts $4^a$ $4^b$.

It will be observed that the two members of my apparatus, the main conveyer and the supporting devices therefor, are not attached together, but independent, and that the main conveyer-belt and the supporting devices are led independently around any supporting or carrying rollers which are shown to or may form part of the apparatus, the conveyer-belt being laid in trough form onto the supporting devices of the carrier and being forced to assume such troughed shape by the combined action of the supporting devices and the tension or strain on the conveyer-belt.

Having thus described my invention, what I claim as new therein, and desire to secure by Letters Patent, is—

1. The combination of a main conveyer-belt, a supporting and troughing mechanism therefor, independent therefrom, composed of troughing members and a supporting belt or carrier to which said members are attached.

2. In apparatus of the character described, the combination of a main conveyer-belt, supporting and troughing mechanism therefor comprising a carrier or carriers having fixed thereto troughing members for the main belt independent of the main belt.

3. In apparatus of the character described, the combination of a main conveyer-belt, supporting and troughing mechanism therefor, independent therefrom, comprising troughing members, independent carrier or carriers to which said members are attached and independent means for driving said supporting and troughing mechanism in the same direction and at the same speed as the main belt.

4. In apparatus of the character described, the combination of a main conveyer-belt, a supporting and troughing mechanism therefor and independent therefrom comprising transversely-disposed trough-shaped members arranged parallel with one another along the belt and an endless support or carrier therefor supporting said members independently of the main belt and extending parallel to the main belt.

5. In apparatus of the character described, the combination of a main conveying-belt, a supporting and troughing mechanism therefor comprising transversely-disposed trough-shaped members arranged parallel with one another along the belt and an endless support or carrier therefor extending parallel to the main belt, and positively driven at the same speed as the main belt.

6. In apparatus of the character described, the combination of a main conveyer-belt, a supporting-belt extending parallel therewith and having supported thereon a plurality of transversely-arranged trough-shaped main-belt-supporting devices, and means for driving both the belts.

7. In apparatus of the character described, the combination of a main conveyer-belt, a supporting-belt extending parallel therewith and having supported thereon a plurality of transversely-arranged trough-shaped main-belt-supporting devices, means for driving both the belts, and means having fixed support for turning up the edges of the main conveyer-belt before it comes in contact with the supporting devices.

8. In apparatus of the character described, the combination of a main conveyer-belt, a supporting-belt extending parallel therewith and having supported thereon a plurality of transversely-arranged trough-shaped main-belt-supporting devices, means for driving both the belts, and independent take-up devices for the two belts.

9. In apparatus of the character described, the combination of a main conveyer-belt, a supporting-belt extending parallel therewith and having supported thereon a plurality of transversely-arranged trough-shaped main-belt-supporting cleats, means for driving both the belts, and means having fixed support for turning up the edges of the main conveyer-belt before it comes in contact with the supporting-cleats.

JNO. J. RIDGWAY.

Witnesses:
HARRY E. KNIGHT,
J. GREEN.